(12) United States Patent
Ramos

(10) Patent No.: US 8,107,893 B2
(45) Date of Patent: Jan. 31, 2012

(54) METHOD AND APPARATUS FOR TRANSMISSION AND RECEPTION OF SIGNALS

(75) Inventor: Jose L. Ramos, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 1269 days.

(21) Appl. No.: 10/618,708

(22) Filed: Jul. 15, 2003

(65) Prior Publication Data

US 2005/0014471 A1    Jan. 20, 2005

(51) Int. Cl.
*H04B 1/40* (2006.01)
(52) U.S. Cl. ............... 455/88; 455/78; 455/127.3
(58) Field of Classification Search ............ 455/78, 455/83, 84, 80, 88, 127.3
See application file for complete search history.

(56) References Cited

U.S. PATENT DOCUMENTS

| | | | | |
|---|---|---|---|---|
| 4,890,069 A * | 12/1989 | Duffalo et al. | ............... | 330/277 |
| 5,940,031 A * | 8/1999 | Turlington et al. | ........... | 342/372 |
| 6,049,250 A * | 4/2000 | Kintis et al. | ................... | 330/54 |
| 7,030,428 B2 * | 4/2006 | Saxler | ........................... | 257/194 |
| 7,079,815 B2 * | 7/2006 | Pozgay et al. | ................. | 455/78 |
| 7,088,969 B2 * | 8/2006 | Khorram | .................... | 455/127.1 |
| 7,205,934 B2 * | 4/2007 | Hall | ............................ | 342/175 |

* cited by examiner

*Primary Examiner* — Yuwen Pan
(74) *Attorney, Agent, or Firm* — Buchanan Ingersoll & Rooney PC

(57) ABSTRACT

A method and apparatus for transmission and reception of signals. An AlGaN amplifier is connected to an antenna. The AlGaN amplifier amplifies signals for transmission over the antenna and signals received from the antenna. Switches are controlled to provide the amplified signals for transmission to the antenna. The switches are also controlled to provide the signals received from the antenna to the AlGaN amplifier and to the receive path of the apparatus.

11 Claims, 7 Drawing Sheets

METHOD AND APPARATUS FOR TRANSMISSION AND RECEPTION OF SIGNALS

BACKGROUND

1. Field

The present invention relates to signal processing. More particularly, the present invention relates to a method and apparatus for processing signals for transmission and for processing received signals.

2. Background Information

Signal processing is typically performed on signals for transmission and on received signals. For example, in a radar system pulsed radar signals for transmission are modulated and amplified. The modulated and amplified radar signals are transmitted over an antenna. The transmitted signals reflect off objects, and the reflected signals are received by an antenna of the radar system. The received signals are amplified and passed to the receiver chain for detection of objects in a radar image.

In many applications system designers strive to minimize the number of components required to perform signal processing. This can be achieved, for example, by combining functions of several components within a single component. Minimization of the number of components can result in smaller system packaging, reducing system costs, and increased signal processing speed. However, it is not always possible to reduce the number of components required to perform a desired signal processing.

SUMMARY OF THE INVENTION

A method and apparatus for transmission and reception of signals are provided. A first switch is set to a first position, the first position connects a signal for transmission to an amplifier. A second switch is set to a first position, the first position connects the amplified signal for transmission to an antenna. After a predetermined amount of time the second switch is set to a second position, the second position connects a signal received from the antenna to a receive path. After the predetermined amount of time the first switch is set to a second position, the second position connecting the receive path to the amplifier.

An apparatus for transmission and reception of signals includes an antenna and an AlGaN amplifier connected to the antenna. The apparatus can include a transmit path, connected to the amplifier, which provides a signal for amplification to the amplifier. The apparatus can include a receive path, connected to the amplifier, which receives an amplified signal from the amplifier.

BRIEF DESCRIPTION OF THE DRAWINGS

Other objects and advantages of the invention will become apparent to those skilled in the art upon reading the following detailed description of preferred embodiments, in conjunction with the accompanying drawings, wherein like reference numerals have been used to designate like elements, and wherein.

DETAILED DESCRIPTION

Figure 1:
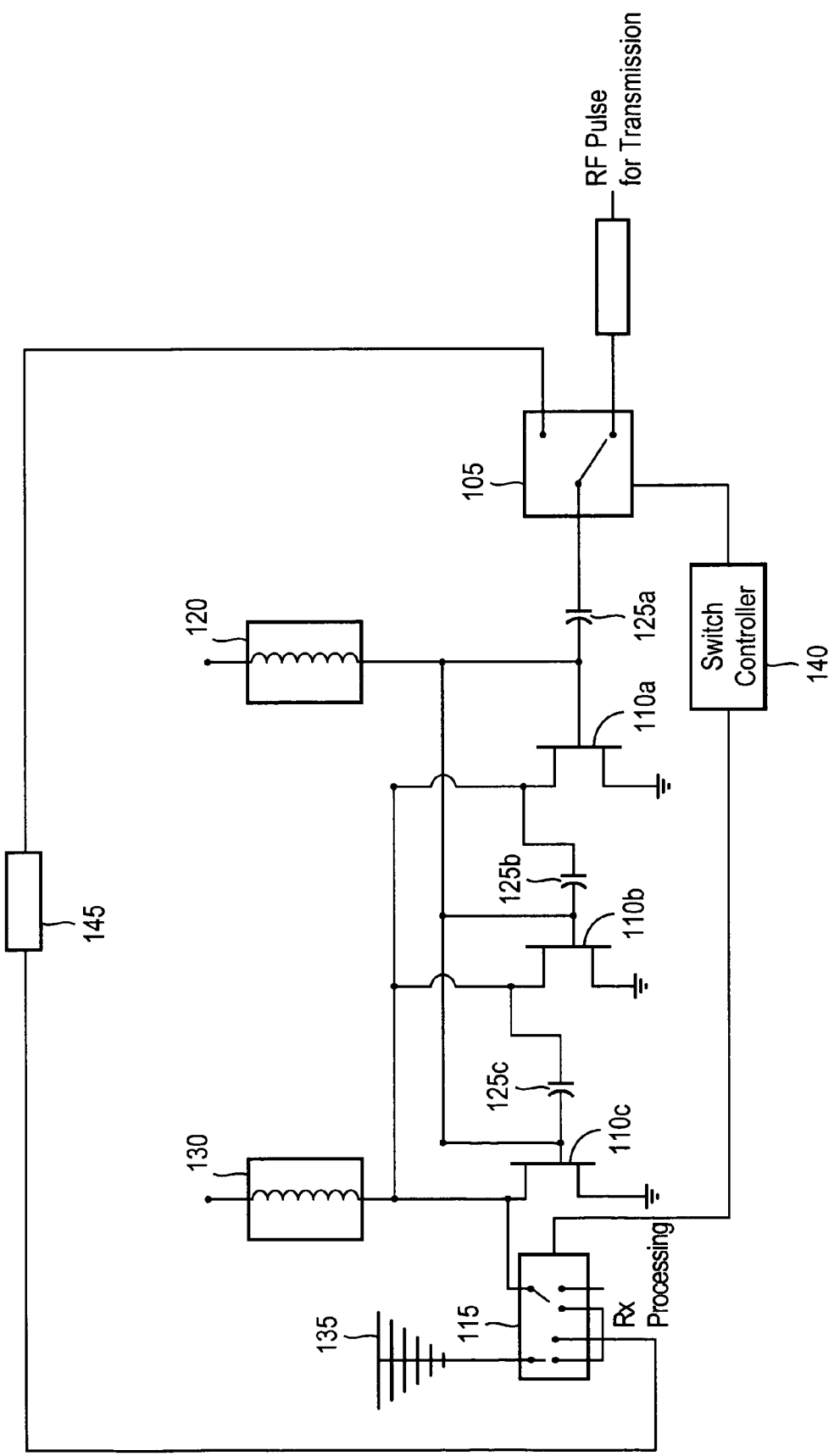
FIG. 1 illustrates radar system front-end signal processing circuitry in accordance with an exemplary embodiment.

FIG. 1 illustrates radar system front-end signal processing circuitry in accordance with an exemplary embodiment. The circuitry includes a first switch 105, amplifiers 110a, 110b and 110c and a second switch 115. In accordance with this exemplary embodiment, amplifiers 110a, 110b and 110c can be AlGaN wideband gap High Electron Mobility Transistors (HEMTs) or AlGaN Monolithic Microwave Integrated Circuits (MMICs). A signal for transmission, for example an RF pulse for transmission, is provided to switch 105. The first switch 105 can be, for example, a single pole double throw switch or any suitable switch. Switch 105 provides the signal for transmission to amplifiers 110, 110b and 110c to amplify the signal prior to transmission. A bias current is provided by DC feed 120 to a connection point between the gate of each transistor 110a, 110b and 110c, and DC blocking capacitors 125a, 125b and 125c. DC feed 130 provides a bias on the drain of transistors 110a, 110b and 110c . The amplified signal for transmission is provided from amplifier 110c to switch 115. Switch 115 connects amplifier 110c to the antenna 135. In accordance with exemplary embodiments, the second switch 115 is a double pole double throw switch.

A predetermined amount of time after transmission of the signal, a switch controller 140 controls the first and second switches 105 and 115 for reception of a return signal. Specifically, a signal received by antenna 135 is connected by the second switch 115 to the receive processing path 145. Receive processing path provides the received signal to the first switch 105 which connects the received signal to amplifiers 110b and 110c. The amplified received signal is provided by amplifier 110c to the second switch 115. The second switch 115 connects the amplified receipt signal to the receiver processing circuitry for further processing of the received signal.

Figure 2:
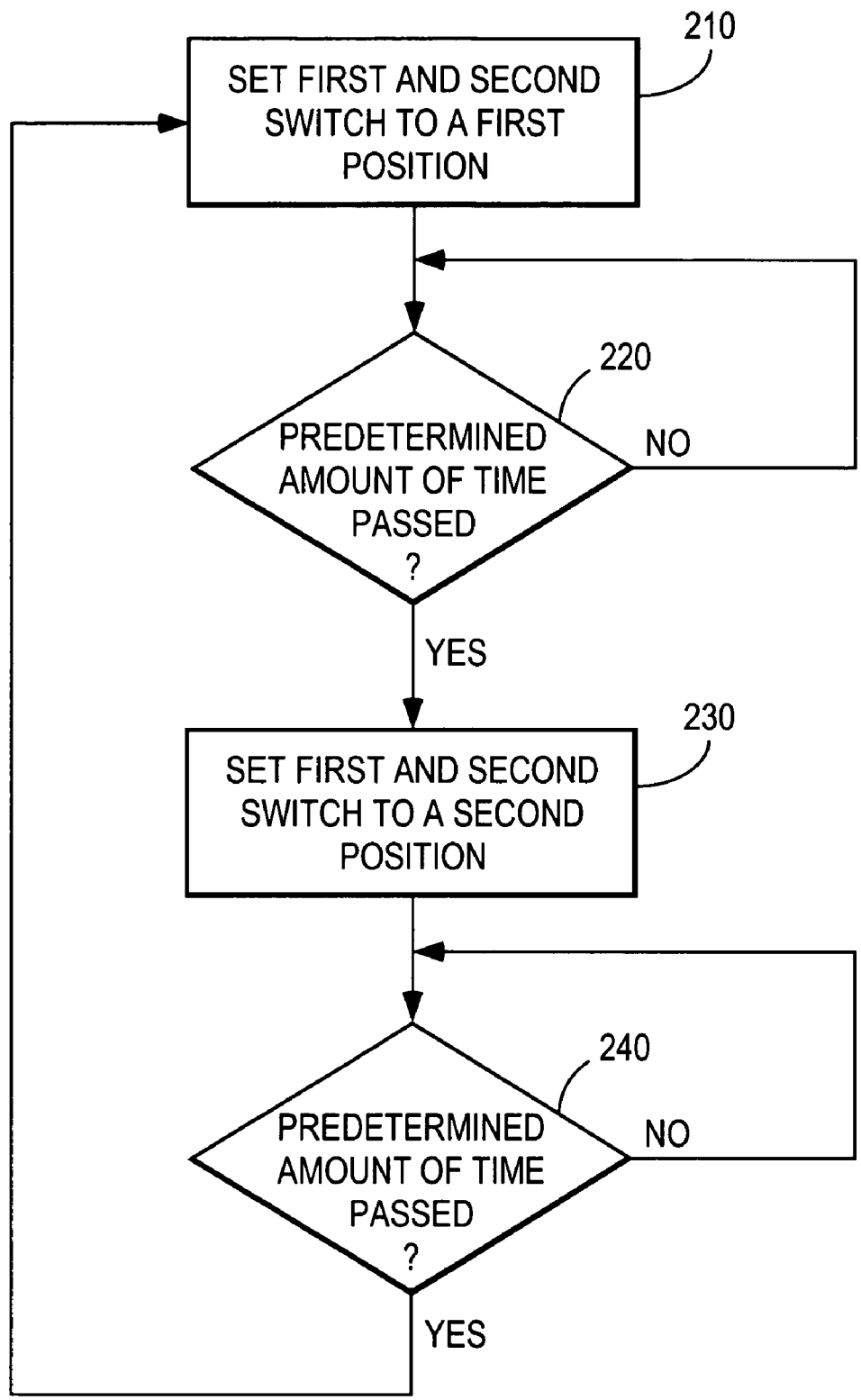
FIG. 2 illustrates a method for switching signals for transmission and received signals in accordance with an exemplary embodiment.

FIG. 2 illustrates an exemplary method for controlling the first and second switches. When a signal is to be transmitted the first and second switches are set to a first position (step 210). Next it is determined whether a predetermined amount of time has passed (step 220). In accordance with exemplary embodiments, the multiplexing of the first and second switch is timed with the radar pulse generation and reception to allow for reflected target return processing. Specifically, the multiplexing depends upon the range as defined by the equation R=ct/2, wherein c represents the speed of light, t represents time and R is the range. The timing of the switches also depends upon the Doppler shift in accordance with the formula $f_d=(2v_r/c)(f_0)$ and the target signature, wherein $f_d$ is the doppler frequency, $v_r$ is the velocity, c is the speed of light and $f_0$ is the frequency of the radar.

Accordingly, after the predetermined amount of time has passed ("YES" path out of decision step 220"), the first and second switches are set to a second switch position for processing of the received return signal (step 230). After another predetermined amount of time has passed, which is equal to the predetermined amount of time in step 220, ("YES" path out of decision step 240") then the first and second switches are reset to the first switch position for transmission of another signal (step 210). To properly process a radar signal the power of the signal should be greater than a minimum detectable signal power. This can be determined in accordance with the following equation:

$$P_{YY} = \frac{[P\,G^{\theta\theta}\lambda]^{1/4}}{[(4)^t S_{Yx\varphi}]}$$

wherein $R_{max}$ is the maximum range, $P_t$ is the transmit power, G is the gain of the antenna, $\lambda$ is the wavelength at the frequency of operation, and $S_{min}$ is the minimum detectable signal.

Figure 3:
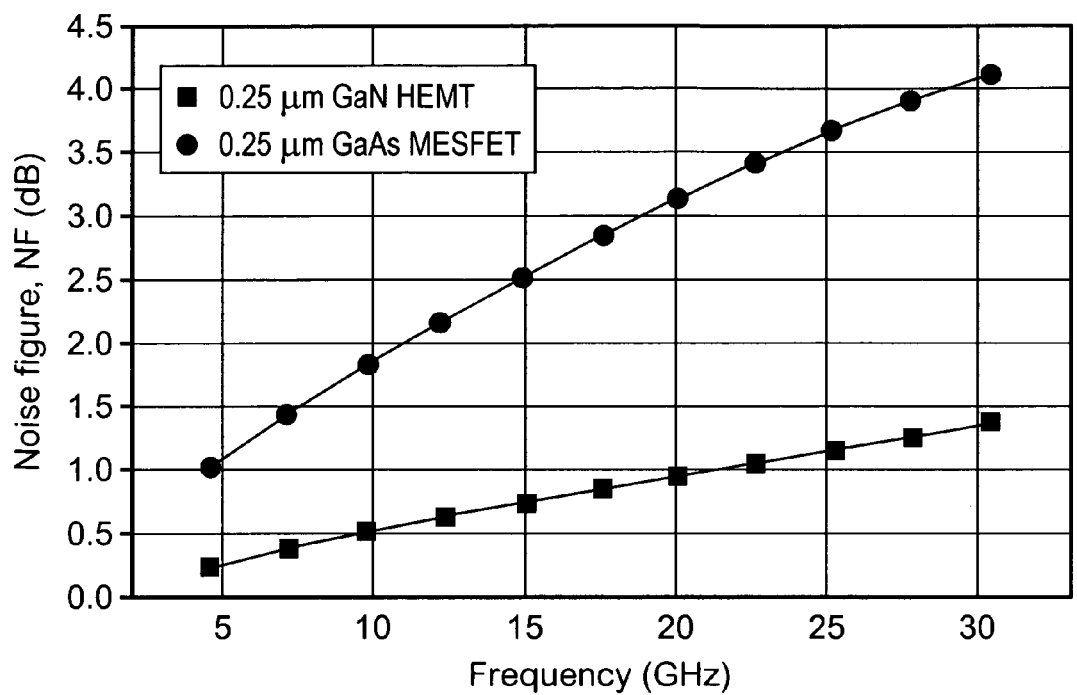
FIG. 3 illustrates the nosie figure for two different types of amplifiers.

Due to a low noise requirement for amplification of received signals, and a high gain requirement for transmitted signals, known systems employ separate amplifiers for these two purposes. Specifically, as illustrated in FIG. 3, GaAs transistors employed by known systems for amplification of transmitted signals have a noise figure which greatly increases as the frequency of the signal increases. In contrast, amplifiers employed herein can comprise GaN transistors which have a much lower noise figure at all frequencies.

Figure 4A:
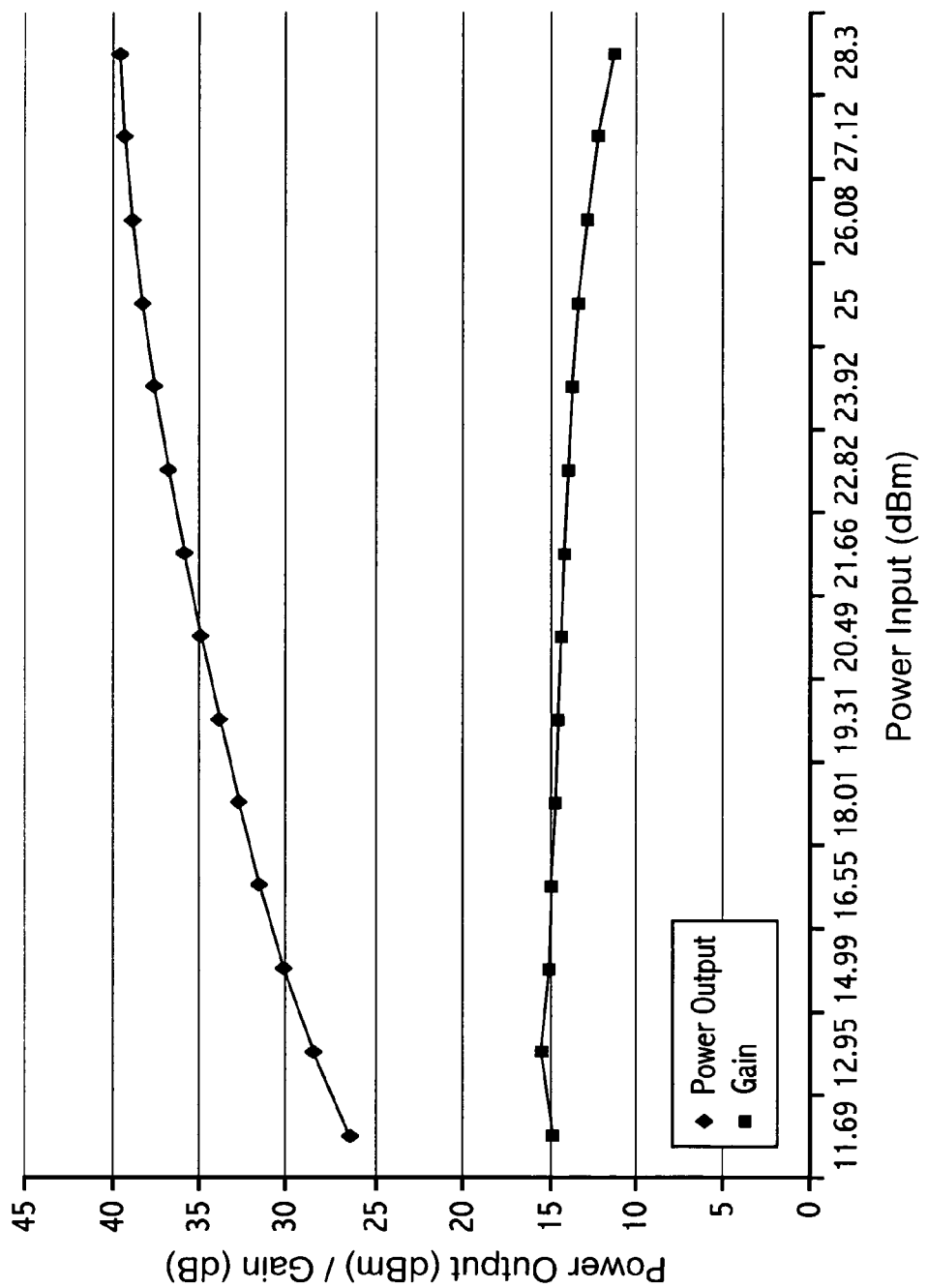
FIGS. 4A-4D illustrate exemplary performance of the amplifier employed by an exemplary embodiment.
Figure 4B:
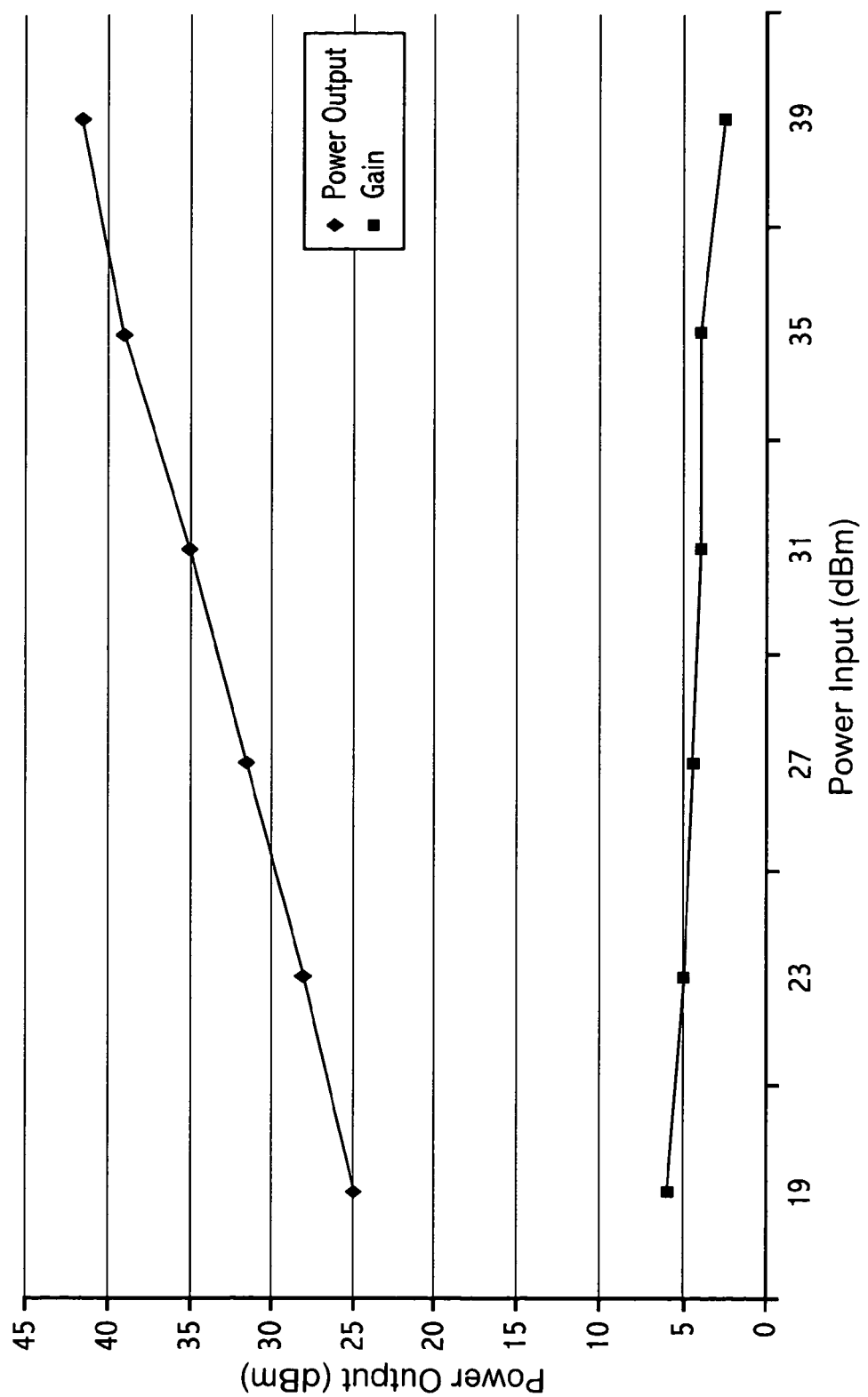
Figure 4C:
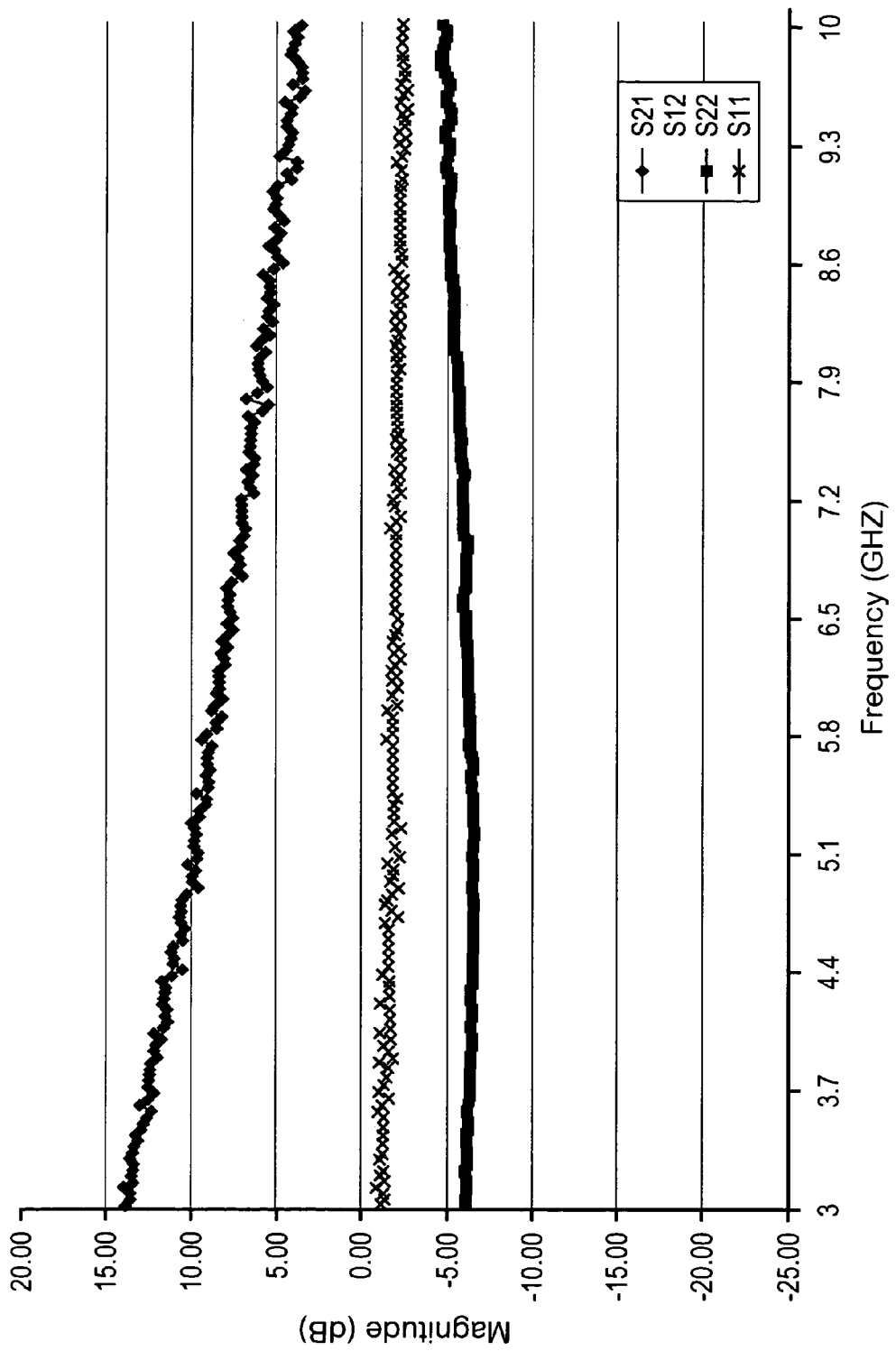
Figure 4D:
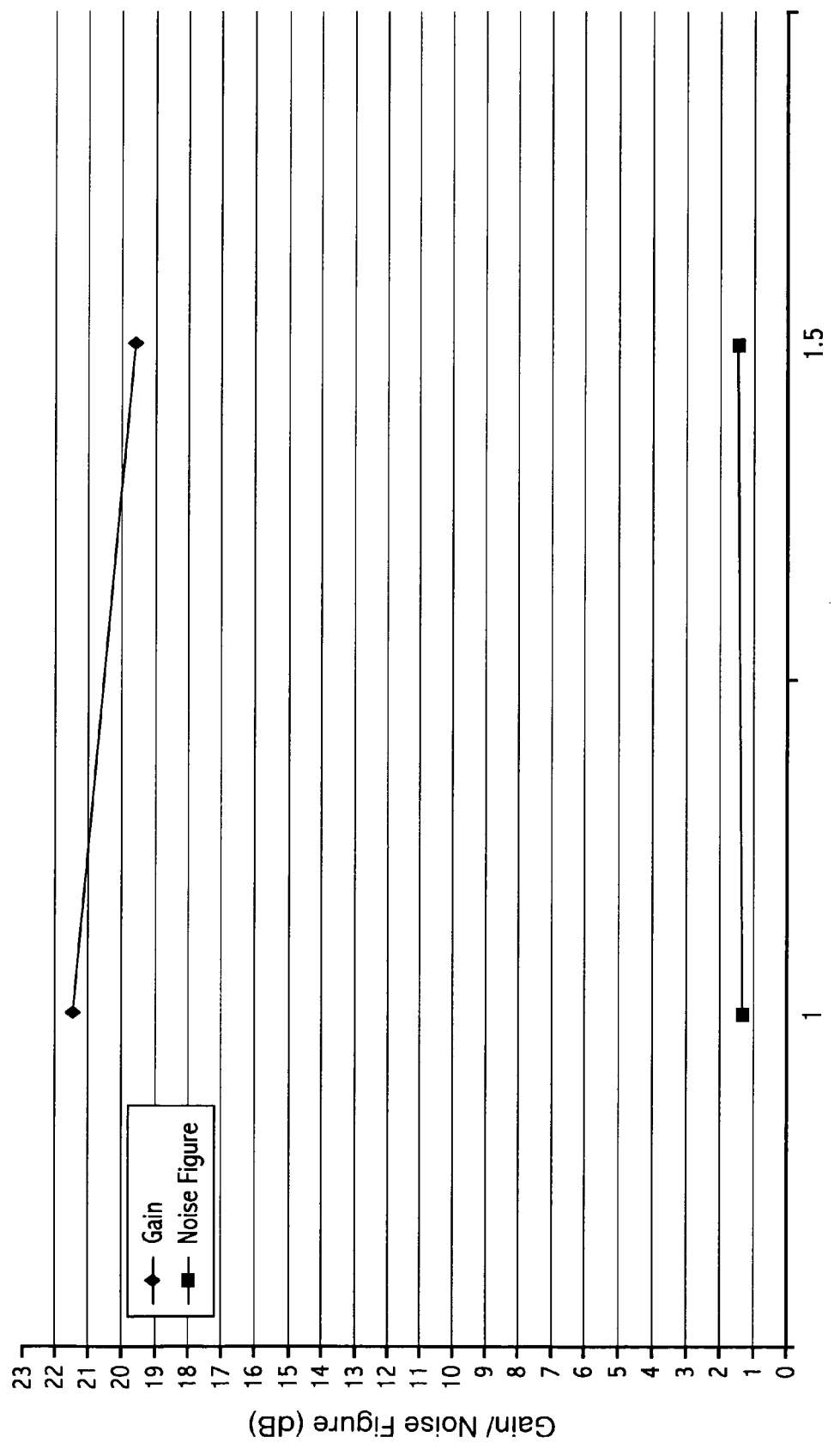

FIGS. 4A-4D illustrate an exemplary performance of AlGaN transistors employed. FIG. 4A illustrates the power output and the gain versus power input for an 3.5 GHz radar pulse with a drain bias voltage of 60 VDC and a drain amperage of 184 for an AlGaN FET with a 1.2 mm total gate periphery. FIG. 4B illustrates the output power compression curve at 8 GHz for a GaN transistor designed to operate in the X Band, i.e., between 8.2 to 12.4 GHz. As illustrated in FIGS. 4A and 4B a GaN transistor can provide a high gain for amplifying the signal for transmission and the low power received signal. FIG. 4C illustrates the device gain (S21), the reverse insertion gain (S12), the output match (S22) and the input match (S11) for a GaN transistor with a drain voltage of 26V and a gate voltage of −2.5V. As illustrated in FIGS. 4A-4C GaN amplifiers provide a linear amplification over a range of input powers. FIG. 4D illustrates the gain and noise figure versus frequency for a GaN transistor with a 1.2 mm total gate periphery, without tuners connected. As illustrated in FIG. 4D the GaN transistor provides a low relatively stable amount of noise over the 1-1.5 GHz frequency range.

Exemplary embodiments as described herein can be used in any radar system. Those skilled in the art will also appreciate that exemplary embodiments can be used in any system where time multiplexing of transmitted and received signals is desired.

The present invention has been described with reference to several exemplary embodiments. However, it will be readily apparent to those skilled in the art that it is possible to embody the invention in specific forms other than those of the exemplary embodiments described above. This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. An apparatus comprising:
    an antenna;
    an amplifier unit connected to the antenna, wherein the amplifier unit includes a first amplifier and a second amplifier, wherein the first amplifier and the second amplifier each include a source, a drain, and a gate, respectively, wherein the gate of the first amplifier and the gate of the second amplifier are connected to a common gate connection, wherein the drain of the first amplifier and the drain of the second amplifier are connected to a common drain connection, and wherein the drain of the first amplifier is connected to the gate of the second amplifier;
    a first switch that connects a transmit path of the antenna to the amplifier unit;
    a second switch that connects a receive path of the antenna to the amplifier unit; and
    a switch controller that is programmed to adjust positions of the first and second switches so that the amplifier unit is connected to the transmit or receive path of the antenna after a predetermined amount of time has elapsed since a prior adjustment.

2. The apparatus of claim 1, wherein the first switch has an output connected to the amplifier unit, a first input connected to the receive path and a second input connected to the transmit path.

3. The apparatus of claim 2, wherein the second switch has a first switch position connecting a signal for transmission to the antenna, and a second switch position connecting the receive path to the antenna.

4. The apparatus of claim 3, wherein the switch controller controls the first and second switches to selectively connect the antenna to the amplifier unit for amplification of a received signal and the amplifier unit to the antenna for amplification of a signal for transmission.

5. The apparatus of claim 1, wherein the amplifier unit comprises a third amplifier including a source, a drain, and a gate, wherein the gate of the third amplifier is connected to the common gate connection, wherein the drain of the third amplifier is connected to the common drain connection, and wherein the drain of the second amplifier is connected to the gate of the third amplifier.

6. The apparatus of claim 1, wherein the amplifiers are wide band gap high electron mobility transistors.

7. The apparatus of claim 1, wherein the amplifiers are monolithic microwave integrated circuits.

8. The apparatus of claim 1, wherein the amplifier is an AlGaN amplifier unit.

9. A method for transmission and reception of signals using a transceiver that includes an antenna, first and second switches, and an amplifier unit, wherein the amplifier unit includes a first amplifier and a second amplifier, wherein the first amplifier and the second amplifier each include a source, a drain, and a gate, respectively, wherein the gate of the first amplifier and the gate of the second amplifier are connected to a common gate connection, wherein the drain of the first amplifier and the drain of the second amplifier are connected to a common drain connection, and wherein the drain of the first amplifier is connected to the gate of the second amplifier, the method comprising:
    setting the first switch to a first position of the first switch, the first position of the first switch connecting a first signal for transmission of the first signal to the amplifier unit for amplification of the first signal;
    setting the second switch to a first position of the second switch, the first position of the second switch connecting the amplified first signal for transmission of the amplified first signal to the antenna;
    setting the first switch, after a predetermined amount of time, to a second position of the first switch, the second position of the first switch connecting the receive path to the amplifier unit for amplification of a second signal received from the antenna; and
    setting the second switch, after the predetermined amount of time, to a second position of the second switch, the second position of the second switch connecting the amplified second signal for further processing of the amplified second signal.

10. The method of claim 9, wherein, when the second switch is in the second position, the amplified second signal from the receive path is connected to receiver circuitry configured to perform the further processing.

11. The method of claim 9, wherein the amplifier unit is an AlGaN amplifier unit.

* * * * *